(12) United States Patent
Middleton et al.

(10) Patent No.: US 7,213,095 B2
(45) Date of Patent: May 1, 2007

(54) BUS TRANSACTION MANAGEMENT WITHIN DATA PROCESSING SYSTEMS

(75) Inventors: Peter Guy Middleton, Mougins (FR); David John Gwilt, Cambridge (GB); Ian Victor Devereux, Cambridge (GB); Bruce James Mathewson, Cambridge (GB); Antony John Harris, Sheffield (GB); Richard Roy Grisenthwaite, Nr Royston (GB)

(73) Assignee: Arm Limited, Cambridge (GB)

( * ) Notice: Subject to any disclaimer, the term of this patent is extended or adjusted under 35 U.S.C. 154(b) by 234 days.

(21) Appl. No.: 10/862,884

(22) Filed: Jun. 8, 2004

(65) Prior Publication Data

US 2005/0273543 A1  Dec. 8, 2005

(51) Int. Cl.
 *G06F 13/36* (2006.01)
(52) U.S. Cl. .................................. 710/310; 711/154
(58) Field of Classification Search ................ 710/112, 710/107, 309–311; 711/154
 See application file for complete search history.

(56) References Cited

U.S. PATENT DOCUMENTS

| | | | |
|---|---|---|---|
| 5,060,145 A | | 10/1991 | Scheuneman et al. |
| 5,666,494 A | * | 9/1997 | Mote, Jr. ..................... 711/167 |
| 5,668,971 A | * | 9/1997 | Neufeld ....................... 711/111 |
| 5,925,118 A | | 7/1999 | Revilla et al. |
| 6,279,087 B1 | * | 8/2001 | Melo et al. .................. 711/146 |
| 6,430,649 B1 | * | 8/2002 | Chaudhry et al. ........... 711/100 |
| 6,513,089 B1 | * | 1/2003 | Hofmann et al. ........... 710/309 |
| 6,832,279 B1 | * | 12/2004 | Potter et al. ................. 710/112 |
| 2002/0194530 A1 | * | 12/2002 | Santeler et al. ................. 714/6 |
| 2004/0260891 A1 | * | 12/2004 | Jeddeloh et al. ............. 711/154 |

FOREIGN PATENT DOCUMENTS

| | | |
|---|---|---|
| EP | 0 497 054 | 8/1992 |
| EP | 0 543 652 | 5/1993 |
| EP | 0 674 258 | 9/1995 |
| GB | 2 341 766 | 3/2000 |

\* cited by examiner

*Primary Examiner*—Mark H. Rinehart
*Assistant Examiner*—Clifford Knoll
(74) *Attorney, Agent, or Firm*—Nixon & Vanderhye P.C.

(57) ABSTRACT

A data processing system is provided with a bus having separate write channels W and read channels R via which bus transactions are made. Bus transaction buffers 34 are provided within the bus structure to buffer write requests, particularly so as to alleviate problems associated with relatively slow bus slaves. The bus transaction buffers 34 are responsive to the memory addresses associated with write requests and read requests which pass through them to identify those to the same memory address, or memory addresses within a predetermined range, so as to either ensure a strict correct ordering of those transactions, read to follow write, or to satisfy a read following a write with a buffered write data value and then flushing the read request such that it does not reach its final destination.

16 Claims, 4 Drawing Sheets

BUS TRANSACTION MANAGEMENT WITHIN DATA PROCESSING SYSTEMS

BACKGROUND OF THE INVENTION

1. Field of the Invention

This invention relates to the field of data processing systems. More particularly, this invention relates to the management and control of bus transactions within data processing systems.

2. Description of the Prior Art

It is known to provide data processing systems having bus structures to connect different circuit elements and via which bus transactions, such as reads, writes and control functions take place. As data processing systems become more complex, such as increasingly complex system on-chip integrated circuits, the bus structures used to connect the various functional elements within the circuit have tended to become more complicated and critical in terms of overall system performance. One known type of bus structure uses a unified read and write channel along which serialized bus transactions are passed. Such a unified channel approach has the advantage that the order in which the bus transactions are issued will be the same as the order in which they are received since all of the bus transactions are serialized at issue on the unified channel. However, such an approach suffers from the disadvantage of a limitation in bus bandwidth and an increase in latency since all of the transactions must pass along a single channel.

An alternative approach is to provide the bus structure with separate read buses and write buses along which data can pass in parallel. Such an approach increases the bus bandwidth available and reduces latency.

SUMMARY OF THE INVENTION

Viewed from one aspect the present invention provides a bus transaction buffer comprising:

one or more write bus inputs and one or more read bus inputs coupled to respective write buses and read buses and operable respectively to receive write requests and read requests from one or more request sources;

one or more write bus outputs and one or more read bus outputs coupled to respective write buses and read buses and operable respectively to output write requests and read requests to one or more request destinations; and a request buffering circuit operable to buffer write requests received from said request sources and to control of processing of write requests and read requests to said one or more request destinations such that one of:

(i) a read request to a given memory address received from a request source having a given request source identifier after a write request to said given memory address was received from said request source having said given request identifier is not output on a read bus output until said write request is acknowledged as completed at a write bus output; or (ii) a read request to a given memory address received from a request source after a write request of a write data value to said given memory address whilst said write request is still buffered by said bus transaction buffer results in said write data value buffered within said bus transaction buffer being output to said read request source to satisfy said read request.

In the context of systems having parallel read and write channels within their bus structures, the present technique recognizes that there can be problems arising from the speeds with which different circuit elements connected to that bus structure can process bus transactions directed to them. As an example, if a system includes one or more particularly slow circuit elements, such as, for example, flash memory elements, then high performance circuit elements, such as, for example, high performance CPUs, may be held up in their processing waiting for bus transaction requests directed at the low performance circuit elements to be completed so as to release the high performance circuit elements to process further transactions. One way of addressing this problem is to provide buffering within the bus structure itself that can be used to buffer transaction requests to desired circuit elements so that other circuit elements can be released to continue processing prior to those buffered transactions actually being completed. In addition to this provision of buffering, the present technique recognizes a particular hazard that can then arise in that with separate read and write channels it is possible if buffering within the bus structure is provided that the order in which transactions are issued may not be the order in which they are completed when they have been subject to buffering in the different channels. The present technique recognizes this hazard and provides the solution of ensuring that the buffering circuits detect transactions to the same memory location from at least the same request source and either properly order these such that reads follow writes in the correct sequence or satisfy reads with the buffered write values as may be desired and appropriate in the particular system concerned.

Within such systems having separate read and write bus channels and within which buffering can take place performance may be increased if the request buffering circuit is arranged to output a request completed signal back to the requesting source prior to that request having been ultimately completed at its final destination. The buffering circuit can thus effectively take responsibility for that request ultimately being properly completed and completed within the correct relative ordering with respect to other bus requests.

In the above context the request buffering circuit is preferably operable to perform these devolved responsibilities for proper bus transaction completion by controlling the relative ordering or forwarding pending write data as desired or appropriate.

The performance of the system may be further improved in embodiments in which a request acknowledgement signal is issued by the request buffering circuit when it receives a write request even before this is notionally completed since this may permit resources such as the address bus to be released for other uses.

It will be appreciated that the request sources could take a variety of different forms including processor cores, direct memory access circuits or further bus transaction buffers within a hierarchical buffered bus structure.

In a similar way the request destinations can take a variety of different forms including memories, memory mapped peripheral circuits and further bus transaction buffers.

As one option requirement the relative ordering of reads to properly follow writes to the same memory address may be preserved when the request source identifier is identical. However, more generally, this principle may be applied when the requests are to the same memory address even if the requests originate from different request sources.

In a similar way, the satisfying of a read request by a buffered write data value may generally be used whenever the buffered write data value for the given memory address is available or alternatively may be more restrictively used when the request source for the data value from the given memory address is the same as the request source which initiated the write of the buffered write data value for that given memory address.

It is preferred within the overall system that non-bufferable write requests should also be supported as these may be appropriate for certain types of peripheral or other device within the overall system. Such non-bufferable requests are ones in which the memory request must be actually completed through to its final destination, irrespective of any intermediate buffering that may or may not occur, before a completed signal is passed back to the original request source. This may be important for situations in which absolute system wide ordering and relative timing is highly critical.

The matching of memory addresses of transactions which should be ordered or otherwise controlled may be a requirement for precise matching or alternatively may be a match determined by an address range rather than a specific memory address value.

Viewed from another aspect the present invention provides a method of control bus transactions, said method comprising the steps of:

receiving write requests and read requests from one or more request sources at one or more write bus inputs and one or more read bus inputs coupled to respective write buses and read buses;

outputting write requests and read requests to one or more request destinations at one or more write bus outputs and one or more read bus outputs coupled to respective write buses and read buses; and buffering write requests received from said request sources and controlling processing of write requests and read requests to said one or more request destinations such that one of:

(i) a read request to a given memory address received from a request source having a given request source identifier after a write request to said given memory address was received from said request source having said given request identifier is not output on a read bus output until said write request is acknowledged as completed at a write bus output; or (ii) a read request to a given memory address received from a request source after a write request of a write data value to said given memory address whilst said write request is still buffered by said bus transaction buffer results in said write data value buffered within said bus transaction buffer being output to said read request source to satisfy said read request.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
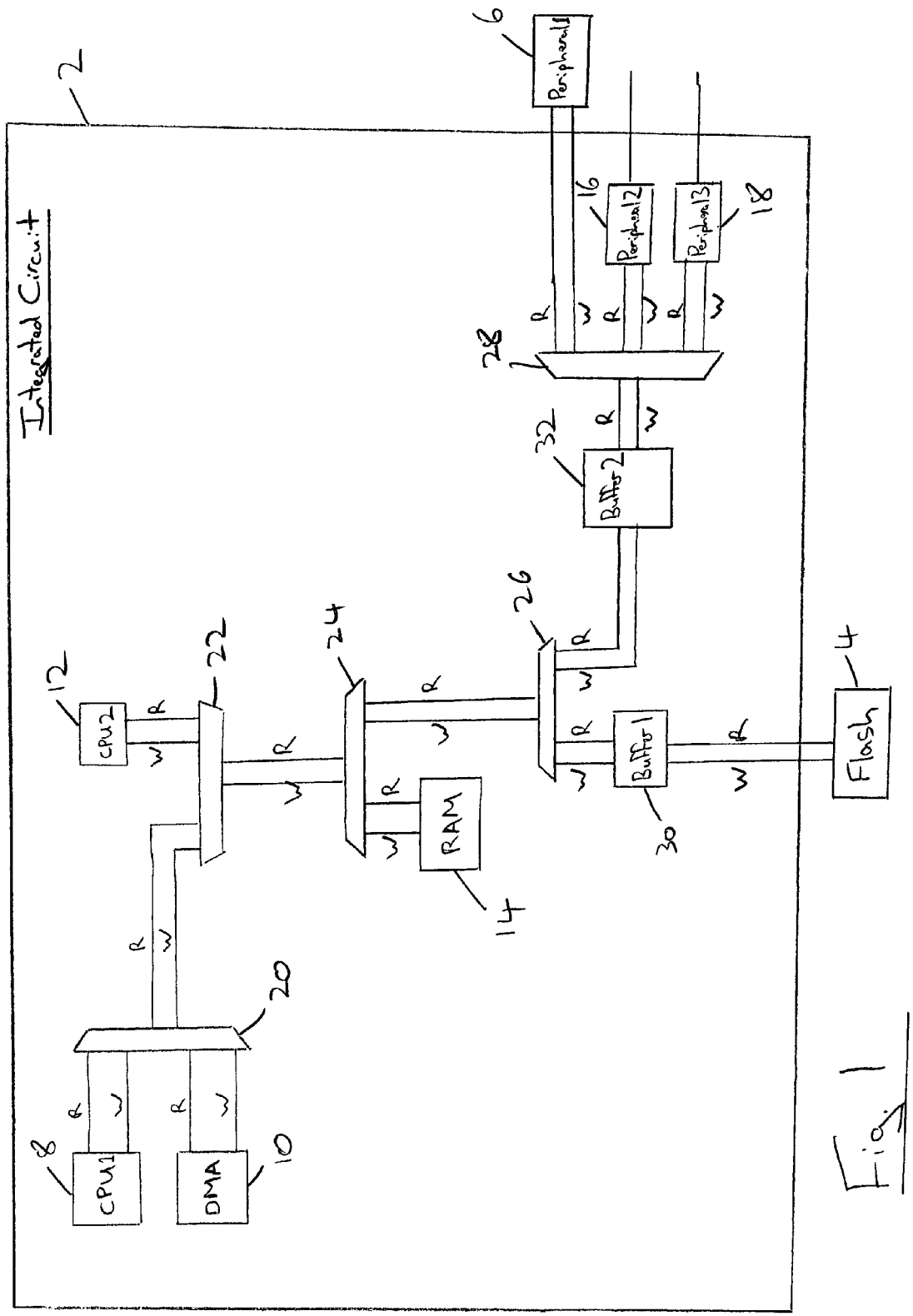
FIG. 1 schematically illustrates a data processing system including a bus structure having separate read channels and write channels.

FIG. 1 schematically illustrates a data processing system including an integrated circuit 2 coupled to an external flash memory 4 and an external peripheral 6. Within the integrated circuit 2, there are provided multiple bus transaction sources 8, 10, 12 in the form of processor cores and direct memory access circuits. Other forms of bus transaction sources are also possible. Bus transaction destinations within the integrated circuit 2 include a random access memory 14, a first peripheral 16 and a second peripheral 18. As will be apparent from FIG. 1, separate read and write channels are provided between the various circuit elements as part of the bus structure. Multiplexers 20, 22 serve to multiplex together read and write channels received from multiple transaction sources down onto one read channel and one write channel. Demultiplexers 24, 26, 28 serve to demultiplex the bus structure back to separate read and write channels for separate transaction destinations.

Within the integrated circuit 2 there are provided bus transaction buffer circuits 30, 32 within the bus structure itself disposed between transaction sources and transaction destinations. More particularly, these bus transaction buffer circuits 30, 32 are provided upstream of relatively slow transaction destinations, such as the off-chip flash memory 4 and the peripheral devices 6, 16, 18. In this way, bus transactions to these relatively slow devices may be buffered within the bus transaction buffer circuits 30, 32 and acknowledged as completed back to their transaction sources allowing those high performance transaction sources to continue processing and operation without having to wait for the relatively slow transaction destinations to actually complete the transactions directed to them.

It will be appreciated by those in this field that the illustration in FIG. 1 shows the separate read and write channels in a highly schematic form and that each of these read and write channels may have its own data bus portion, address bus portion, control signal portion, hand shaking signal portion and the like. There are a wide variety of different possibilities for such systems having separate read channels and write channels. The present technique is also not limited to systems having only a single read channel and a single write channel as it is possible for the present techniques also to be used in systems having multiple read channels, multiple write channels or both multiple read and multiple write channels.

Figure 2:
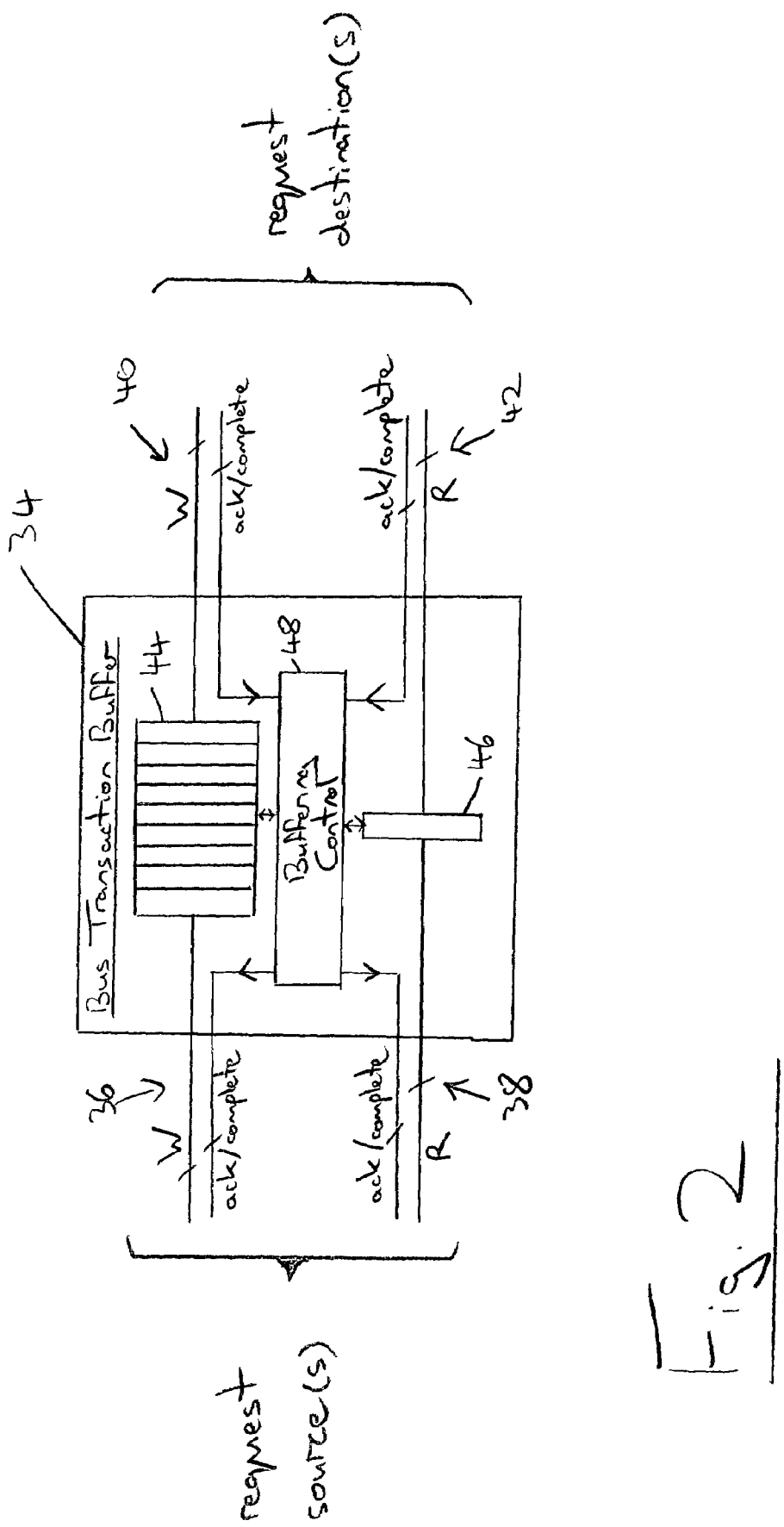
FIG. 2 schematically illustrates a bus transaction buffer.

FIG. 2 schematically illustrates a bus transaction buffer 34 in more detail. The illustrated bus transaction buffer 34 includes a write bus input 36 and read bus input 38. A write bus output 40 and a read bus output 42 are also provided. Within the bus transaction buffer 34, a multiple entry write buffer 44 having the form of a FIFO is provided together with what can be considered to be a single entry read request buffer 46. Between the read request buffer 46 and the write buffer 44, request buffering control circuit 48 serves to compare the memory addresses at which read requests and write requests are directed to identify when these match, either precisely or within a predetermined range of address values, and then take predetermined action to preserve the transaction request ordering.

When a write request to a given memory address is received, this is buffered within the write buffer 44. A read request to that same memory address may later be received by the bus transaction buffer 34 and this later received read request is identified by the request buffering control circuitry 48 such that the read request is held off (considered as buffered) within the read request buffer 46 until the matching write request within the write buffer 44 has been output from the bus transaction buffer 34 and acknowledged as completed by the transaction destination to which it is being sent. As an alternative, if the architecture and characteristics of the target device and overall systems so provide, then it is possible that the later received read request which matches a pending write request may be satisfied by returning the write data value which is buffered within the write buffer 44 in response to that read request rather than actually sending that read request onto its final transaction destination. Such an approach effectively also preserves the correct ordering of the transactions.

Whilst it is possible to match transactions together purely on the basis of the memory address to which they are directed, preferred embodiments may also match the transaction requesting source identifiers before taking action appropriate upon a match as described above. In this way only transactions issuing from the same logical source will be strictly ordered and different sources will have to deal with out-of-order issues as is already known within multi bus master systems.

Figure 3:
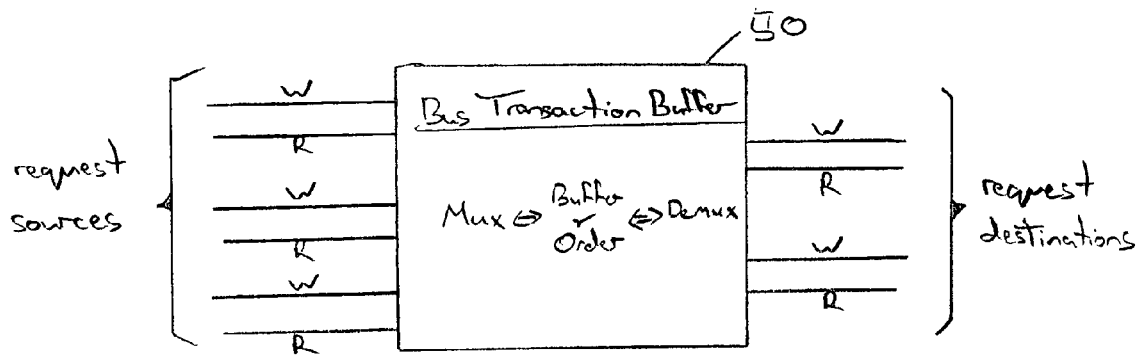
FIG. 3 schematically illustrates a bus transaction buffer additionally providing multiplexing and demultiplexing functions.

FIG. 3 schematically illustrates a second example bus transaction buffer 50. In this example, the bus transaction buffer 50 includes multiple write bus inputs, multiple write bus outputs, multiple read bus inputs and multiple read bus outputs. The bus transaction buffer 50 thus provides multiplexing, buffering, ordering and demultiplexing functions.

Figure 4:
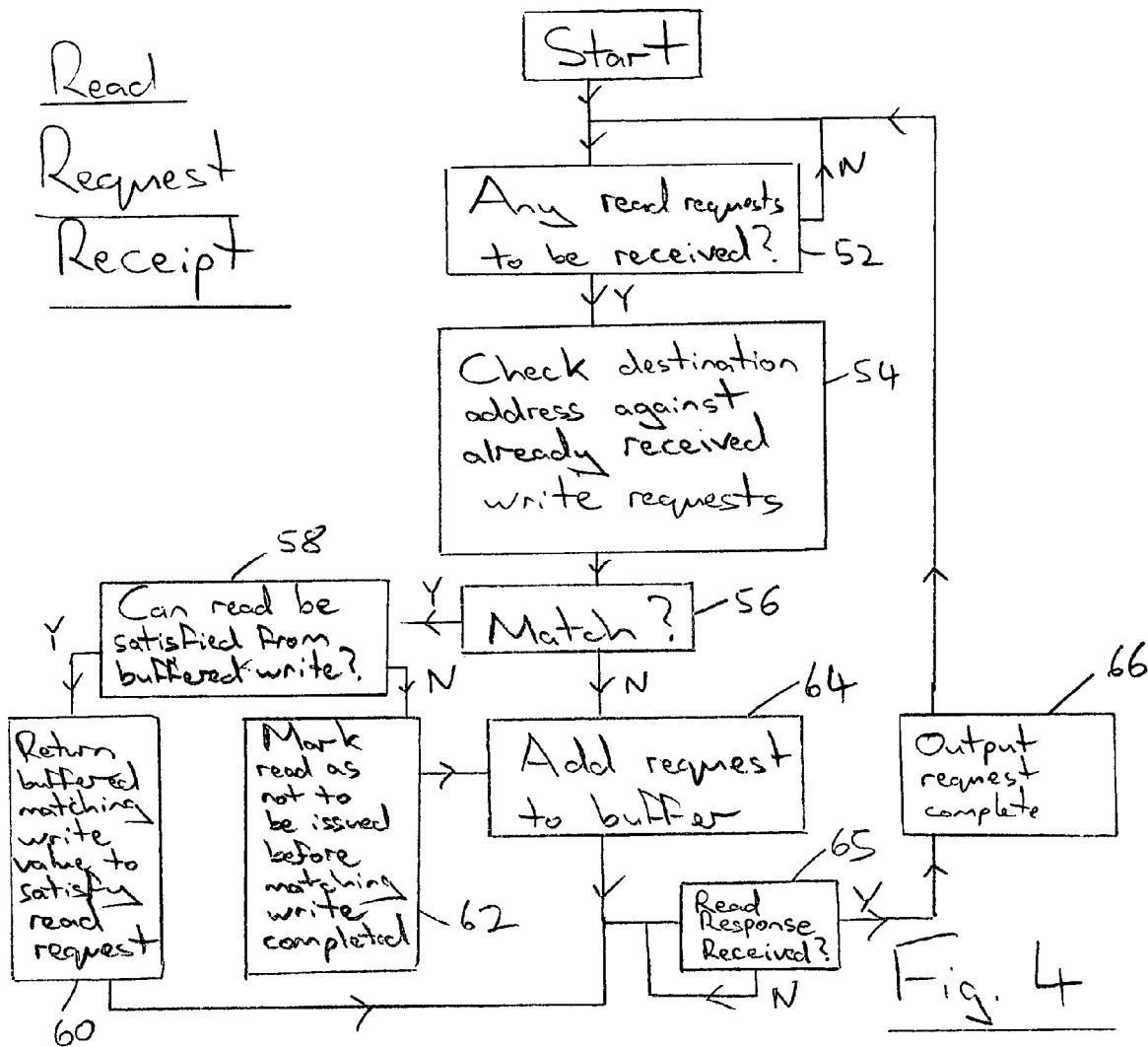
FIG. 4 is a flow diagram schematically illustrating read request receipt processing within a bus transaction buffer.

FIG. 4 is a flow diagram schematically illustrating read request receipt processing as may be performed by the bus transaction buffer 34 and more particularly control as performed by the request buffering control circuit 48. At step 52, the system waits for any read request to be received. When a read request is received, then step 54 checks the destination address for that read request against any already received write requests which are currently being buffered within the write buffer 44. If a match is detected at step 56, then processing proceeds to step 58 at which it is determined whether or not the address concerned is one which is able to be satisfied with respect to a read from a buffered write data value rather than actually reading the data value from the final transaction destination. If the read can be satisfied in this way, then step 60 returns the buffered write data value from the write buffer 44 as the response to the received read request and the received read request is flushed and not forwarded to its final destination. If such read request processing from a buffered write data value is not possible, then step 62 deals with the read request by marking it as one which should not be issued from the bus transaction buffer 34 until the matching write request has been issued and acknowledged as completed either by its final destination or by the next buffering element which is taking responsibility for the correct completion and ordering of that write request. If the read request is marked in this way, then it is then added to the read request buffer 46 at step 64. Subsequent to either step 60 or step 64, step 65 waits for the bus transaction buffer to receive the read response before proceeding to step 66 which outputs a request complete signal back to the original read request source to indicate that the bus transaction buffer 34 has now effectively taken responsibility for that read request, its proper completion and its in-order completion. If the match at step 56 was not detected, then processing proceeds to step 64 and step 66 directly.

Figure 5:
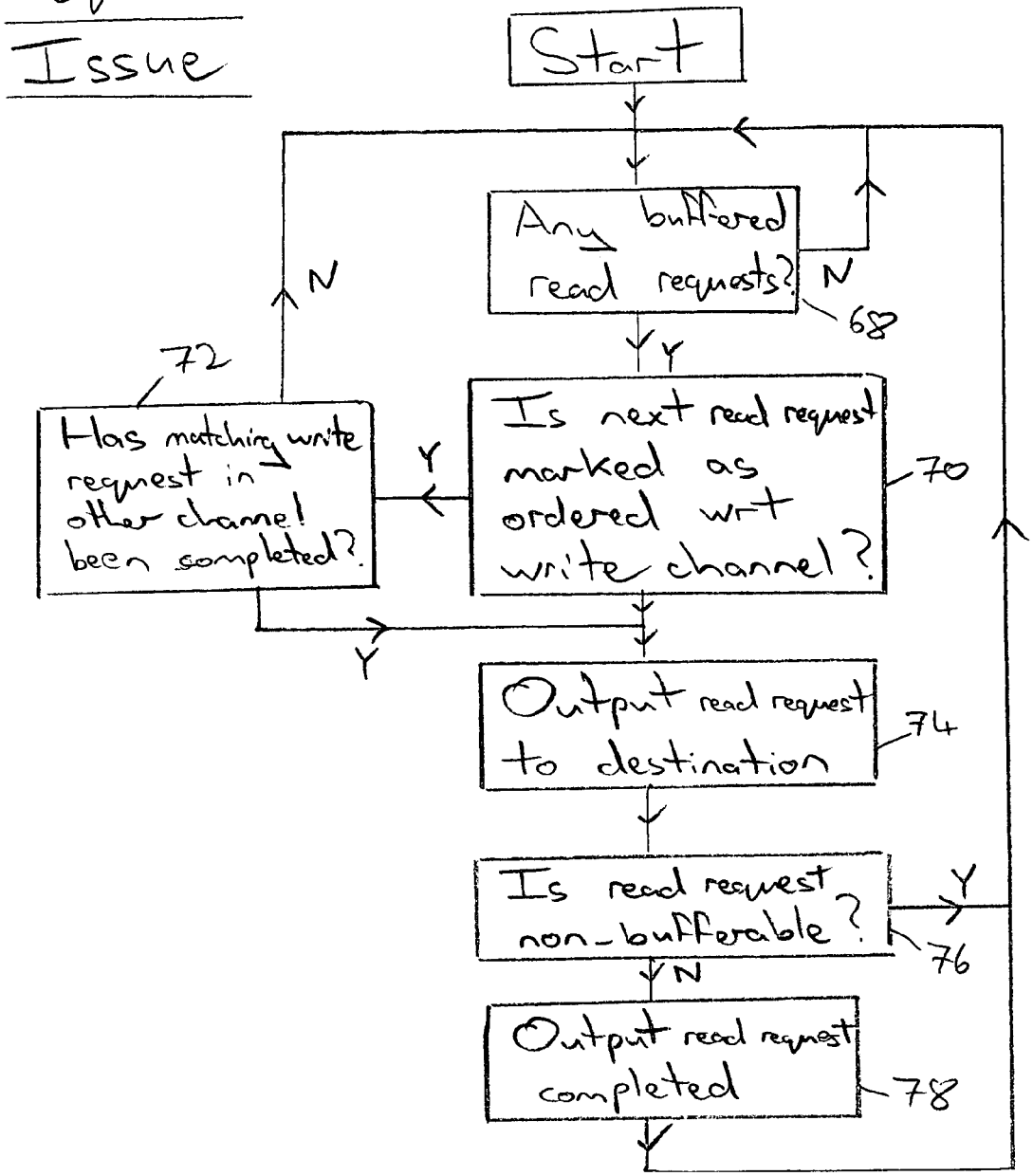
FIG. 5 is a flow diagram schematically illustrating read request issuing within a bus transaction buffer.

FIG. 5 is a flow diagram schematically illustrating read request issue from the bus transaction buffer 34. At step 68, the system waits until there are buffered read requests to be issued. At step 70 the next to be serviced read request is examined to determine if it is marked as one which should be ordered to follow completion of a buffered write request. If the read request is so marked, then step 72 determines whether the matching write request in the other channel has yet been completed. If the matching write request has not been completed, then processing returns to step 68. If the matching write request has been completed, or step 70 did not identify the read request as one marked as being ordered, then processing proceeds to step 74 at which the read request is output to the transaction destination. If the read request is non-bufferable, i.e. one which should not be acknowledged as completed until it is actually completed at the final destination, then step 76 diverts processing back to step 68 for a later request completed signal to be generated by another mechanism. If the read request is not non-bufferable, then step 78 outputs a read request completed signal once the read request has been output to the transaction destination, or at least the next bus transaction buffer, at step 74.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A bus transaction buffer comprising:
   one or more write bus inputs and one or more read bus inputs coupled to respective write buses and read buses and operable respectively to receive write requests and read requests from one or more request sources;
   one or more write bus outputs and one or more read bus outputs coupled to respective write buses and read buses and operable respectively to output write requests and read requests to one or more request destinations; and
   a request buffering circuit operable to buffer write requests received from said request sources and to control processing of write requests and read requests to said one or more request destinations, wherein at least some of said read requests include a read request, to a given memory address and received from a request source having a given request source identifier after a write request to said given memory address was received from said request source having said given request source identifier, which is not output on a read bus output until said write request is acknowledged as completed at a write bus output, wherein said request buffering circuit is operable to output a request completed signal to a request source in respect of a write request received from said request source before a corresponding request completed signal for said write request has been received at said write bus output for said write request.

2. A bus transaction buffer as claimed in claim 1, wherein said request buffering circuit controls processing of a read request to a given memory address relative to an earlier received write request to said given memory address until said request completed signal has been received at said write bus output.

3. A bus transaction buffer as claimed in claim 1, wherein upon receipt of a write request or a read request from a request source said request buffering circuit is operable to issue a request acknowledgement signal to said request source.

4. A bus transaction buffer as claimed in claim 1, wherein said one or more of request sources include one or more of:
 a processor core;
 a direct memory access circuit; and
 a further bus transaction buffer.

5. A bus transaction buffer as claimed in claim 1, wherein said one or more request destinations include one or more of:
 a memory;
 a memory mapped peripheral circuit; and
 a further bus transaction buffer.

6. A bus transaction buffer as claimed in claim 1, wherein said request buffering circuit is operable to control ordering of said write request and said read request to said given memory address irrespective of which of said one or more request sources issued said write request and said read request.

7. A bus transaction circuit as claimed in claim 1, wherein non-bufferable write requests to non-bufferable memory addresses are also received from said plurality of request sources and, in response to a non-bufferable write request to a non-bufferable memory address, said request buffering circuit does not issue a write complete signal until it has receive a write complete signal at a write bus output.

8. A bus transaction circuit as claimed in claim 1, wherein said request buffering circuit is operable to control relative ordering of write requests and read requests to memory addresses with a predetermined range of each other.

9. A method of control bus transactions, said method comprising the steps of:
 receiving write requests and read requests from one or more request sources at one or more write bus inputs and one or more read bus inputs coupled to respective write buses and read buses;
 outputting write requests and read requests to one or more request destinations at one or more write bus outputs and one or more read bus outputs coupled to respective write buses and read buses; and
 buffering write requests received from said request sources and controlling processing of write requests and read requests to said one or more request destinations such that for at least some read requests a read request to a given memory address received from a request source having a given request source identifier after a write request to said given memory address was received from said request source having said given request source identifier is not output on a read bus output until said write request is acknowledged as completed at a write bus output,
 wherein a request completed signal is output to a request source in respect of a write request received from said request source before a corresponding request completed signal for said write request has been received at said write bus output for said write request.

10. A method as claimed in claim 9, wherein processing of a read request to a given memory address relative to an earlier received write request to said given memory address is controlled until said request completed signal has been received at said write bus output.

11. A method as claimed in claim 9, wherein upon receipt of a write request or a read request from a request source a request acknowledgement signal is issued to said request source.

12. A method as claimed in claim 9, wherein said one or more of request sources include one or more of:
 a processor core;
 a direct memory access circuit; and
 a further bus transaction buffer.

13. A method as claimed in claim 9, wherein said one or more request destinations include one or more of:
 a memory;
 a memory mapped peripheral circuit; and
 a further bus transaction buffer.

14. A method as claimed in claim 9, wherein ordering of said write request and said read request to said given memory address is controlled irrespective of which of said one or more request sources issued said write request and said read request.

15. A method as claimed in claim 9, wherein non-bufferable write requests to non-bufferable memory addresses are also received from said plurality of request sources and, in response to a non-bufferable write request to a non-bufferable memory address, a write complete signal is not issued until a write complete signal has been received at a write bus output.

16. A method as claimed in claim 9, wherein relative ordering of write requests and read requests to memory addresses with a predetermined range of each other are controlled.

* * * * *